(12) United States Patent
Rosendahl et al.

(10) Patent No.: US 6,279,082 B1
(45) Date of Patent: *Aug. 21, 2001

(54) SYSTEM AND METHOD FOR EFFICIENT USE OF CACHE TO IMPROVE ACCESS TO MEMORY OF PAGE TYPE

(75) Inventors: Lennart Michael Rosendahl, Farsta; Tomas Lars Jonsson, Södertälje; Per Anders Holmberg, Stockholm, all of (SE)

(73) Assignee: Telefonaktiebolaget LM Ericsson (publ), Stockholm (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/173,389

(22) Filed: Oct. 14, 1998

(51) Int. Cl.$^7$ .................................................... G06F 12/08
(52) U.S. Cl. .............................. 711/138; 711/168; 711/122
(58) Field of Search ................................... 711/122, 168, 711/138, 137

(56) References Cited

U.S. PATENT DOCUMENTS

| | | | |
|---|---|---|---|
| 4,387,427 | 6/1983 | Cox et al. | 709/102 |
| 4,847,758 * | 7/1989 | Olson et al. | 711/133 |
| 5,325,508 * | 6/1994 | Parks et al. | 711/118 |
| 5,349,656 | 9/1994 | Kaneko et al. | 709/102 |
| 5,452,456 | 9/1995 | Mourey et al. | 713/100 |
| 5,469,555 * | 11/1995 | Ghosh et al. | 711/133 |
| 5,524,212 | 6/1996 | Somani et al. | 711/121 |
| 5,553,270 * | 9/1996 | Rosenbluth | 711/169 |
| 5,590,328 | 12/1996 | Seno et al. | 709/105 |
| 5,761,708 * | 6/1998 | Cherabuddi et al. | 711/118 |
| 5,781,922 | 10/1998 | Braceras et al. | 711/118 |
| 5,829,010 * | 10/1998 | Cherabuddi | 711/100 |

FOREIGN PATENT DOCUMENTS

| | | |
|---|---|---|
| EP 0412949 | 2/1991 | (EP) . |
| 0488566 | 6/1992 | (EP) . |
| 9318459 | 9/1993 | (WO) . |

OTHER PUBLICATIONS

Patent Abstracts of Japan, vol. 014, No. 415 (P–1102), Sep. 7, 1990, "Updating Method for Cache Memory", Seki Yukihiro.

IBM Technical Disclosure Bulletin., vol. 32, No. 6A, Nov. 1989, "Processor Performance Enhancement Using a Memory Cache Scheme", pp. 373–379, XP000043248.

International Search Report

* cited by examiner

Primary Examiner—Reginald G. Bragdon
(74) Attorney, Agent, or Firm—Jenkens & Gilchrist A Professional Corporation

(57) ABSTRACT

A method and system are described for improving memory access. The invention will improve memory access in systems where program code and data stored in memory have low locality. The invention builds on that the access to at least some addresses of the memory will take longer time than the access to other addresses, such as, for example, page type memory.

35 Claims, 5 Drawing Sheets

SYSTEM AND METHOD FOR EFFICIENT USE OF CACHE TO IMPROVE ACCESS TO MEMORY OF PAGE TYPE

BACKGROUND OF THE INVENTION

1. Technical Field of the Invention

The present invention relates to computer systems and, in particular, to a system and method for improving access to memory of a page type.

2. Description of Related Art

As is well-known to those skilled in the art, the rapid increase in processor speed have greatly outpaced the gains in memory speed. Consequently a chief bottleneck in the performance of current computers is the primary memory (also called main memory) access time. Conventional techniques to overcome this performance hindrance place a small and fast memory called cache memory in between the processor and the primary memory. Information frequently read from the primary memory is copied to the cache memory so future accesses of that information can be made from the fast cache memory instead of from the slower primary memory. For performance and cost reasons several levels of cache memories are used in modern computers. The first level, also the smallest and fastest cache memory, is called L1 cache and placed closest to the processor. The next level of cache memory is consequently called L2 cache and placed in between the L1 cache and the primary memory.

For most systems the traditional use of cache memory works fine but in complex real time systems, such as, for example, modern telecommunication systems, the amount of code executed and data handled is very large and context switching, switching between different processes, is frequent. In these complex real time systems the locality of information, program code and data, stored in the primary memory is low. Low locality means that a large part of the accessed information is spread out in the primary memory, low spatial locality, or that only a small part of the accessed information is referenced frequently, low temporal locality. With low locality the cache hit ratio, that is how frequently information can be accessed from the cache memory, will also be low as most information will be flushed out of the cache memory before it is needed again. Consequently the normal use of cache memories, especially the L2 cache and above, will not be effective in complex real time systems.

It would therefore be advantageous if the use of cache memories could be more effective in complex real time systems.

In systems where the cache hit ratio is low, a lot of effort has been put on selecting what information to write to the cache memory. This has resulted in advanced prediction algorithms, which take some extra time from the normal execution and also delay the writing of information back to the cache memory.

It would therefore be advantageous if the selection of the information to store in the cache memory could be simplified.

In traditional systems the writing of the information to store in the cache memory is done after the information is read from the primary memory, on a separate memory access cycle, which takes extra time and cause execution delays.

It would therefore be advantages if the information to store in the cache memory could be written to the cache memory with less delays than in the prior art.

A typical conventional memory is built up of a large number of memory cells arranged in a number of rows and columns. The rows and columns of memory cells create a memory matrix. Most memory used today is of page type, e.g. FPM DRAM, EDO DRAM and SDRAM. A memory cell in a page type memory can't be accessed until the row containing this memory cell has been opened. Accessing a new row, often referred to as opening a new page, takes some extra time called page setup time. Consequently accessing information in a new, not opened, page normally takes a longer time, for SDRAM often much longer, than accessing information from an open page in the primary memory. For systems where the cache hit ratio is low, the primary memory will be accessed frequently and an extra delay will be encountered each time a new page is opened in the primary memory.

It would therefore be advantageous if the execution delay when accessing a new page in primary memory could be reduced, especially in systems that normally have a low cache hit ratio.

In traditional systems, where the access time for the cache memory is typically much shorter than for the primary memory, the primary memory is accessed only after the cache memory has been accessed and a cache miss occurred. Waiting for a cache miss before accessing the primary memory thus causes an extra delay in the primary memory access.

It would therefore be advantageous to reduce the access time for the primary memory when a cache miss occurs.

It is, therefore, a first object of the present invention to provide a system and method for a more efficient use of cache memory, especially in systems where the cache hit ratio normally is low.

It is a second object of the present invention to simplify the selection of information to store in the cache memory.

It is a third object of the present invention to reduce the extra time needed to write information to the cache memory.

It is a fourth object of the present invention to reduce the execution delay normally encountered when a new page is accessed in primary memory.

It is a fifth object of the present invention to reduce the delay in accessing the primary memory after a cache miss.

SUMMARY OF THE INVENTION

The present invention is directed to a system and method to improve memory access, and more specifically, to make more effective use of cache memory and reduce the execution delays when a new page in a page type memory is accessed.

The present invention uses a higher level cache memory to store information from only a selected number, n, of the first accessed addresses in each accessed page of the primary memory. The number, n, is preferably selected so that the n accesses to the cache memory gives the processor enough information to keep it busy while a new page is opened in the primary memory.

The invention also provides a novel arrangement of control, address and data busses among the cache and primary memory to reduce the aforementioned delays associated with the use of cache memory in conventional systems.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

The preferred embodiments of the present invention and its advantages are best understood by referring to FIGS. 1–6 of the drawings, like numerals being used for like and corresponding parts of the various drawings. The present invention is for simplicity reasons described for an external (relative to the CPU), second level (L2) cache memory but this should not be seen as a limitation of the present invention. The system and method used in the present invention can easily be adopted to use with any number of levels of cache memories, internal as well as external.

Figure 1:
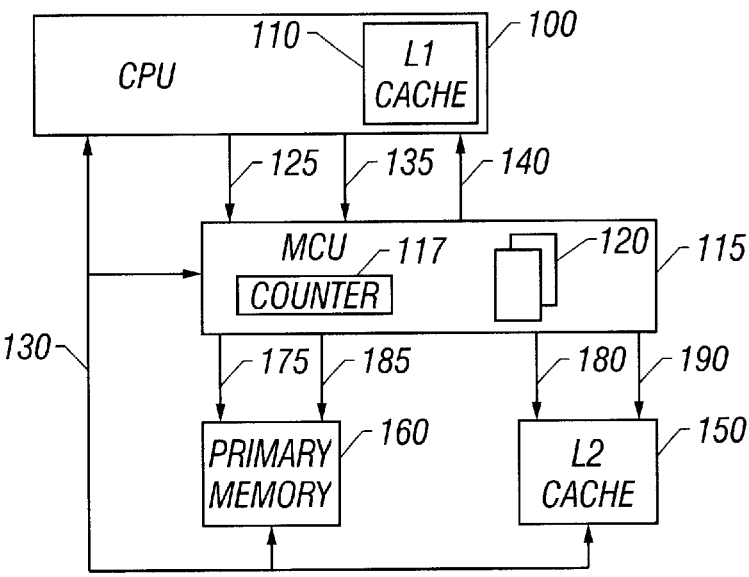
FIG. 1 shows a computer architecture which can be used to implement the present invention.

FIG. 1 shows an exemplary computer architecture which can be used to implement the present invention. The computer includes a processing unit (CPU) 100, with an internal level one (L1) cache memory 110. The CPU is connected to a memory controller (MCU) 115 via an address bus 125, a data bus 130, a control bus 135 and a status bus 140. The CPU is also connected to a level two (L2) cache memory 150 and the primary memory 160 on the data bus 130. The MCU (115) contains a number of internal registers 120 that can be used to store information related to the L2 cache memory (150) and primary memory (160). The MCU (115) also contains a counter 117 that can be used to count a number of memory accesses. The MCU (115) is connected to the primary memory (160) and the L2 cache memory (150) via two separate address busses 175, 180 and two separate control busses 185, 190. The separate address busses (175, 180) and control busses (185, 190) makes it possible for the MCU (115) to access either of the L2 cache memory (150) and the primary memory (160) independently of the other. As the L2 cache memory (150) and the primary memory (160) also share the same data bus (130), the separate control busses (185 and 190) make it possible for the MCU to direct the copying information from the primary memory (160) to the L2 cache memory (150) at the same time this information is read out of the primary memory (160). However this particular architecture is not intended as a limitation to the present invention. The method used in the present invention can easily be adapted to a different computer architecture, such as, for example, the MCU can be an integrated part of the CPU.

Figure 2:
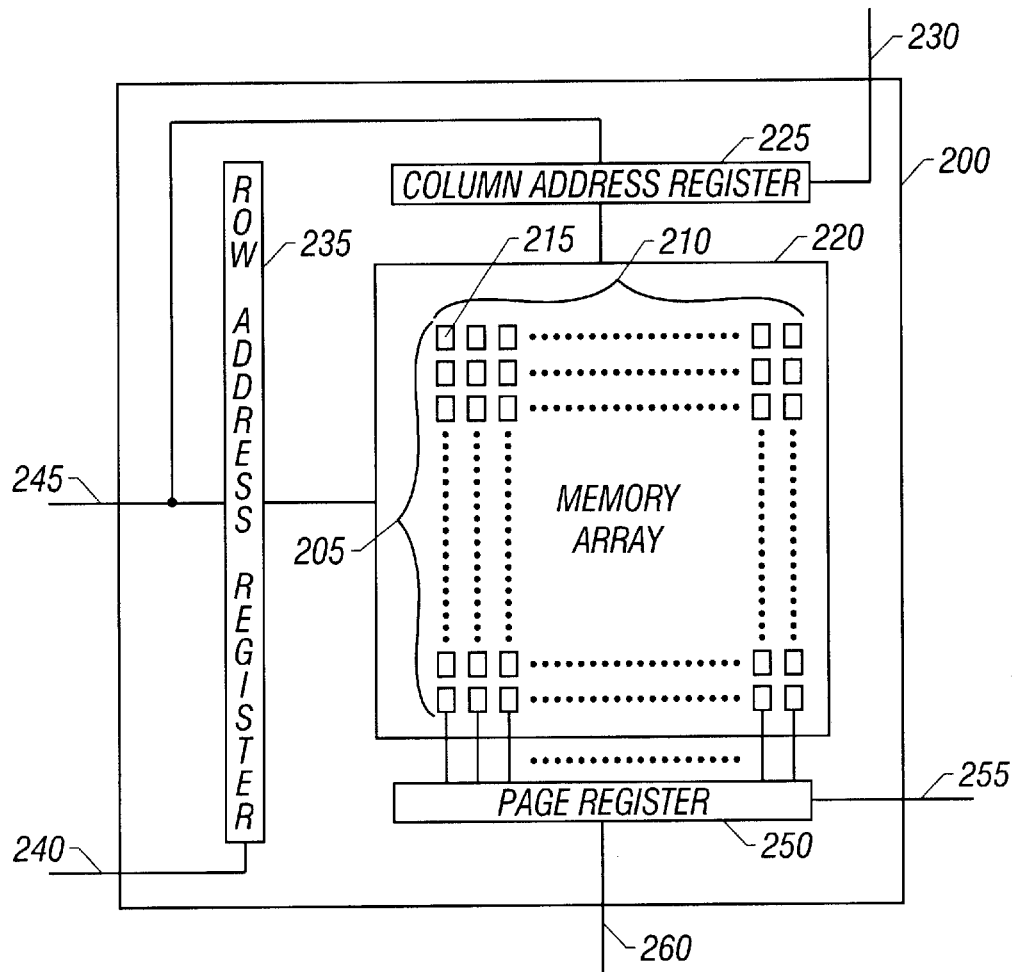
FIG. 2 shows a primary memory of page type, which can be used in the present invention.

FIG. 2 shows an example of a conventional primary memory of page type, which can be used in the present invention. The memory 200 is built up of a number of rows 205 and columns 210 of memory cells 215 that forms a memory matrix 220. Each memory cell has a unique address, specified by its row address and its column address. The information in a specified memory cell can't be accessed directly from the memory matrix (220), the row containing the specified memory cell first needs to be copied over to the page register 250 before the contents of the specified memory cell can be read out on the data bus 260. Before a new row is copied from the memory matrix (220) to the page register (250) the current row is copied back to memory matrix (220). The time it takes to copy the open row back to its place in the memory matrix (220), e.g. closing the current page, and bring the contents of a new row of memory cells into the page register (250), e.g. opening a new page, is referred to as the page setup time. Accessing the contents of a specified memory cell not currently stored in the page register (250), e.g. reading from a new page, is done in two steps. In the first step the specified memory cell's row address needs to be provided on the address bus 245 before the row address pin 240 is asserted. This causes the memory (200) to first copy the contents of the page register (250) to the row with the address currently stored in the row address register 235 before the new address on the address bus 245 is stored in the row address register (235) and the contents of all memory cells in this new row are copied to the page register (250). In the second step the specified memory cell's column address needs to be provided on the address bus (245) before the column address pin 230 is asserted. This causes the memory (200) to copy the address on the address bus (245) to the column address register (225). The content of the specified memory cell is now accessible on the data bus 260 when the read pin 255 is asserted. The row address register (235) and column address register (225) are used to store respective row and column address parts and to speed up the memory access as the address on the address bus (245) only needs to be valid when the appropriate row/column address pin (240/230) is asserted.

Accessing the contents of any memory cell currently stored in the page register (250) is done by putting that memory cell's column address on the address bus (245) and asserting the column address pin (230). The contents of that memory cell is then accessible on the data bus (260) when the read pin (255) is asserted. Consequently the access time is shorter when accessing a memory cell within an open page than when accessing a memory cell that requires a new page to be opened.

However this particular memory architecture is not intended as a limitation to the present invention. The method used in the present invention can easily be adapted to a different memory architecture.

Figure 3:
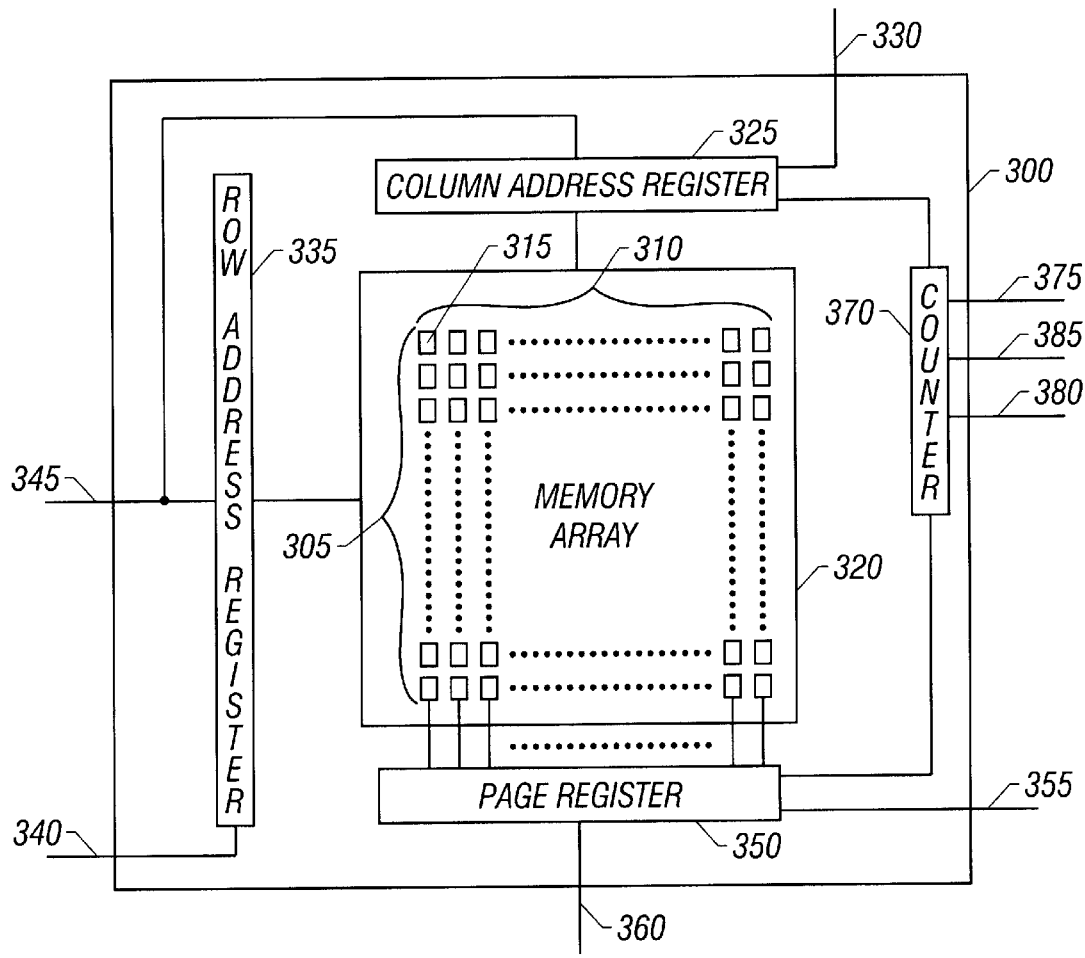
FIG. 3 shows a synchronous, burst mode, memory of page type, which can be used in the present invention.

FIG. 3 shows an example of a conventional synchronous primary memory of page type with burst mode, which can be used in the present invention. The architecture and function is equivalent to the memory described in FIG. 2 except that this memory is of synchronous type and has burst mode capability. Burst mode means that a specified number of consecutive addresses in a row can be read from by only giving the start address and the burst length. The function will be exemplified with a burst read cycle.

Accessing information from a number of consecutive memory cells not stored in the page register 350 in burst mode is done in three steps. In the first step the new row address needs to be provided on the address bus 345 before the row address pin 340 is asserted. This causes the memory 300 to copy the contents of the page register (350) to the row with the address currently stored in the row address register 335 before the address on the address bus (345) is stored in the row address register (335) and the contents of the memory cells in the this row are copied to the page register (350). In the second step the first memory cell's column address needs to be provided on the address bus (345) before the column address pin 330 is asserted. This will cause the memory (300) to store the address on the address bus (345)

in the column address register 325. In the third step the burst length is set by loading the counter 370, which is done by providing the burst length on the data bus (360) before the counter load pin 380 is asserted. When the read pin 355 and count enable pin 385 are asserted the memory will at every clock cycle, provided to the memory on the clock input pin 375, put data on the data bus 360 starting with the contents of the memory cell designated by the column address earlier stored in the column address register (325) and then continuing with the contents of a burst length of consecutive memory cells in this row. As this is a synchronous memory the CPU will know when the information is available on the data bus and there is no need to give a new address for each consecutive address that is accessed.

Accessing the contents of memory cells currently stored in the page register (350), an open page, is done in two steps. In the first step the starting memory cell's column address needs to be provided on the address bus (345) before the column address pin (330) is asserted. In the second step the burst length is set by loading the counter (370), which is done by providing the burst length, n, on the data bus (360) and then asserting the counter load pin (380). When the read pin (355) and count enable pin (385) are asserted the memory will at every clock cycle, provided to the memory on the clock input pin (375), put data on the data bus (360) starting with the contents of the memory cell with the column address earlier stored in the column address register (325) and then the contents of a burst length, n, of consecutive memory cells in the page register. Consequently the access time is shorter when accessing memory cells within an open page than when accessing memory cells that require a new page to be opened.

However this particular memory architecture is not intended as a limitation to the present invention. The method used in the present invention can easily be adapted to a different memory architecture.

Figure 4:
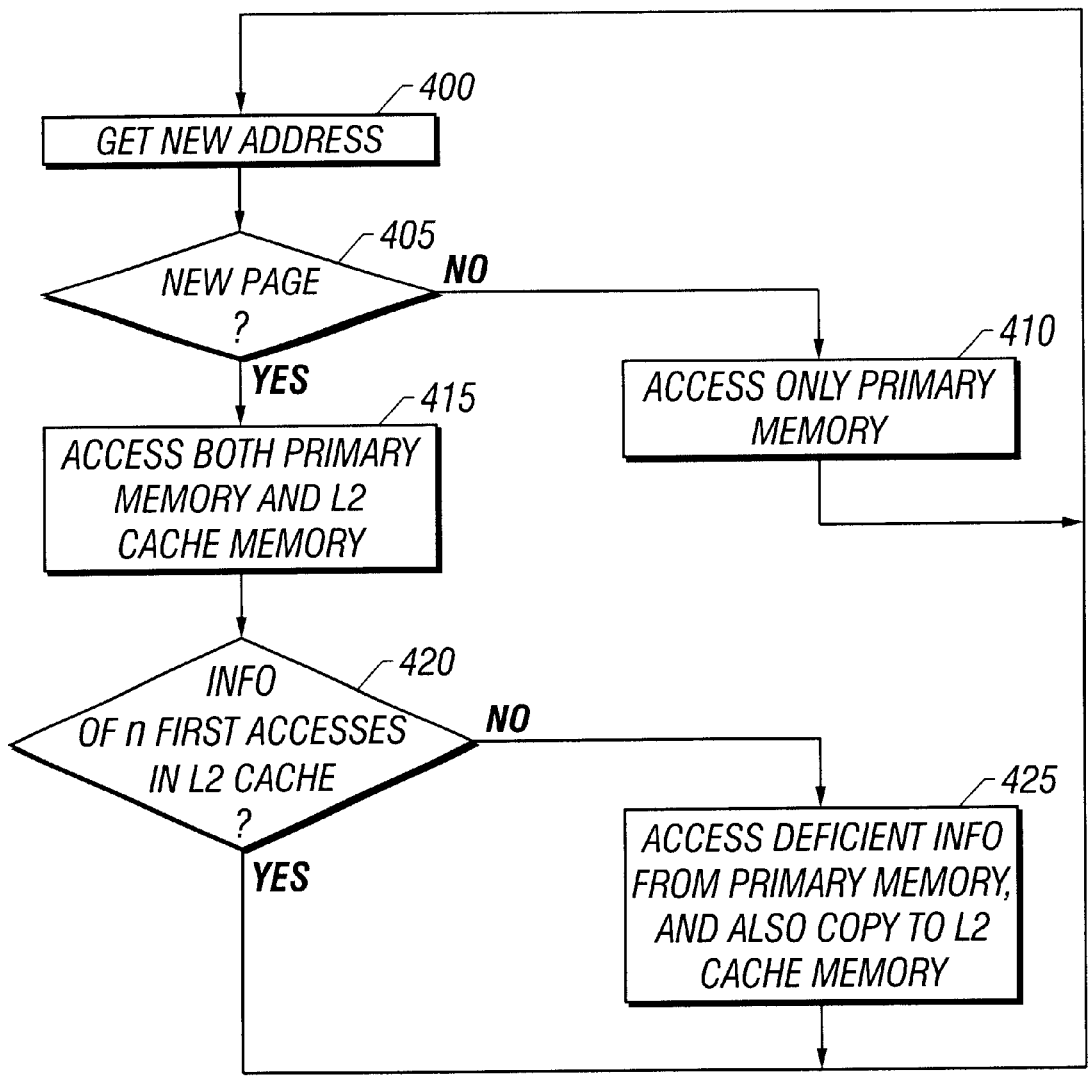
FIG. 4 is a flow diagram of a general outline of the present invention.

FIG. 4 shows in a flow chart a general outline of an exemplary memory access technique according to the present invention. At step 400 the CPU will start a new memory access by obtaining the new address and checking that this address is not found in the internal L1 cache memory (if the new address is found in the L1 cache memory there is no need for an external memory access and step 400 is repeated with the next address). The CPU will at step 405 check if the new address is within the open page of the primary memory. If the new address is within the open page of the primary memory the CPU will at the next step 410 only access the primary memory. After the current memory access is completed the next memory address is obtained at step 400.

Otherwise, when at step 405 the new address is not within the open page of the primary memory, a new page needs to be opened and the CPU will at step 415 access both the primary memory and the L2 cache memory simultaneously. As the CPU, via the memory controller (MCU), is connected to the primary memory and the L2 cache memory with separate address busses and separate control busses the primary memory and the L2 cache memory can simultaneously be addressed and controlled independently at the same time. At step 420 the CPU will access the L2 cache memory for the n next memory accesses. The number n can be selected, for example, depending on the CPU execution speed and the number of average memory accesses from a page before another page needs to be accessed. If, for example, the CPU can execute maximally eight instructions while a new page is set up in the primary memory and the data bus width allows two instructions to be read in one access, then the number n could be selected to be four (8/2). But if, for example, the CPU on average will only execute six instructions before another page needs to be accessed, then n is preferably selected to three, the lowest of the numbers four and three. If, at step 420, n accesses to the L2 cache memory were successful the next memory address is obtained at step 400.

Otherwise, if not all n accesses from the L2 cache memory were successful at step 420, i.e. a cache miss occurred, the CPU will wait at step 425 until the new page has been set up in the primary memory, and will then access the deficient information from the primary memory. At the same time the information (i.e. the reminder of the n accesses not found in L2 cache memory) from the primary memory is available on the data bus, the CPU (via the MCU) directs a write order to the L2 cache memory. As the primary memory and L2 cache memory have a common data bus but separate control busses and separate address busses, the L2 cache memory can be updated at the same time information is delivered from the primary memory and thus not cause any extra delay for the L2 cache memory update. After the n memory accesses are completed the next memory address is obtained at step 400.

As can be seen in FIG. 4, if all the information of the first n accesses to a new page in the primary memory can be found in the L2 cache memory, the CPU execution will not be delayed when this new page is opened in the primary memory. If all the information of the first n accesses to a new page of primary memory is not found in the L2 cache memory, then the CPU will read the missing (deficient) information from the primary memory and also store this information in the L2 cache memory for possible use in future accesses of this page.

Figure 5:
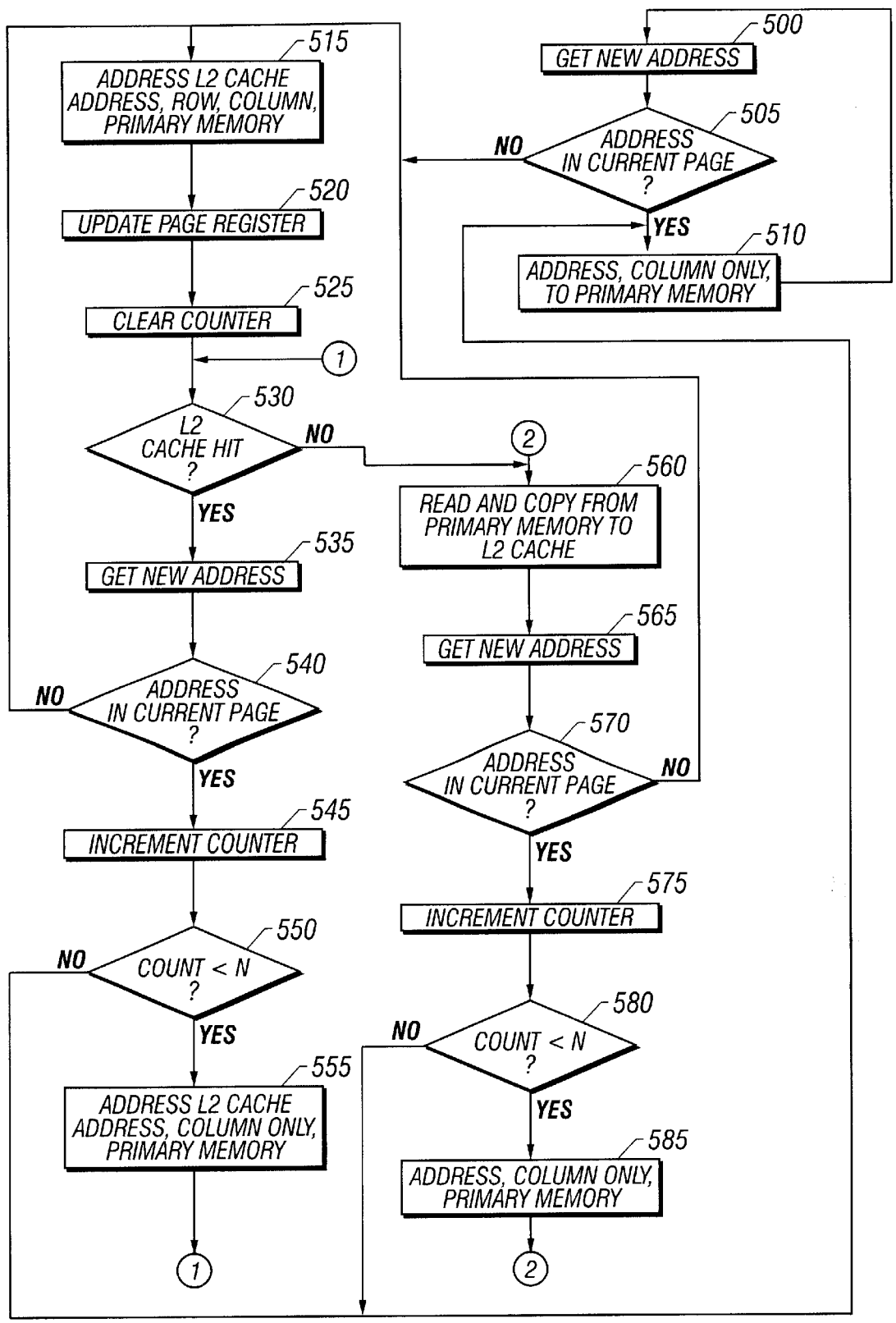
FIG. 5 is a flow diagram of a first embodiment of the present invention.

FIG. 5 shows in a flow chart a first example embodiment of a memory access technique used in the present invention. This embodiment is directed to memory without burst capacity. At step 500 the CPU starts accessing information (e.g. program code or data) from a new address, not found in the internal L1 cache memory, by putting the new address out on the address bus and notifying the MCU of the new address. The MCU will at step 505 check if the new address is within the current page of the primary memory, for simplicity the MCU may keep a copy of the last row address provided to the primary memory in an internal register. When the new address is within the current page of the primary memory the MCU will only access the primary memory with the column part of the new address at step 510. When this memory access is completed the next memory address is obtained at step 500.

Otherwise, when at step 505 the new address is not in the current page of the primary memory, the MCU will at step 515 simultaneously address the L2 cache memory and the primary memory. The L2 cache memory is addressed with the full address while the primary memory is addressed with the row address first and column address secondly, as the primary memory address bus is multiplexed. The MCU will at step 520 update its internal page register with the new page address. At step 525 the MCU will set its internal count register to zero. The count register is used to keep track of how many of the first accessed addresses in a page in the primary memory should be copied to the L2 cache memory. At step 530, when the L2 cache memory has delivered information, including a tag, to the MCU, the MCU will examine the tag to see if the information is valid, a L2 cache hit, or not valid, a L2 cache miss. If, at step 530, the information is valid, this memory access is completed and the MCU will at step 535 get the next address from the CPU.

The MCU will at step 540 compare the next address received from the CPU with the address stored in its internal page register. If, at step 540, the next address is within the page stored in the internal page register, an open page, the MCU will at step 545 increment the value in the internal count register. The MCU will at step 550 check if the value in the internal count register is below a set value n. The number n is preferably selected so that n accesses from the L2 cache memory will keep the CPU executing without delay (keep the CPU busy) while a new page is set up in the primary memory, as has been explained in more detail with FIG. 4. If, at step 550 the value in the internal count register is below the value n the MCU will at step 555 access the L2 cache memory and the primary memory simultaneously. The L2 cache memory is addressed with the full address while the primary memory is addressed with only the column address. After step 555 the MCU will return back to step 530.

Otherwise, when at step 530 the information received from the L2 cache memory is found not valid, a L2 cache miss, the MCU will at step 560 wait until the new page is opened before accessing the information from the primary memory. At the same time the information from the primary memory is available on the data bus the CPU, via the MCU, directs a write order to the L2 cache memory. As the primary memory and L2 cache memory has a common data bus but separate control busses and separate address busses the L2 cache memory can be updated at the same time information is delivered from the primary memory and thus not cause any extra delay for the L2 cache memory update. At step 565 a new address to access is received from the CPU. At step 570 the MCU checks if the received address is in the current page of the primary memory. If, at step 570 the address is in the current page of the primary memory the MCU will at step 575 increment its internal counter. The MCU will at step 580 check if the value in the internal count register is below a set value n. If, at step 580 the value in the internal count register is below the set value n the MCU will at step 585 address only the primary memory. At this time only the column part of the address is used as the page is already open. After step 585 the MCU will return back to step 560.

Otherwise, when at step 540 the next address is not within the page stored in the internal page register the next step is to return to step 515.

Otherwise, when at step 550 the value in the internal count register is not below the value n the next step is to return to step 510.

Otherwise, when at step 570 the next address is not within the page stored in the internal page register the next step is to return to step 515.

Otherwise, when at step 580 the value in the internal count register is not below the set value n the next step is to return to step 510.

Figure 6:
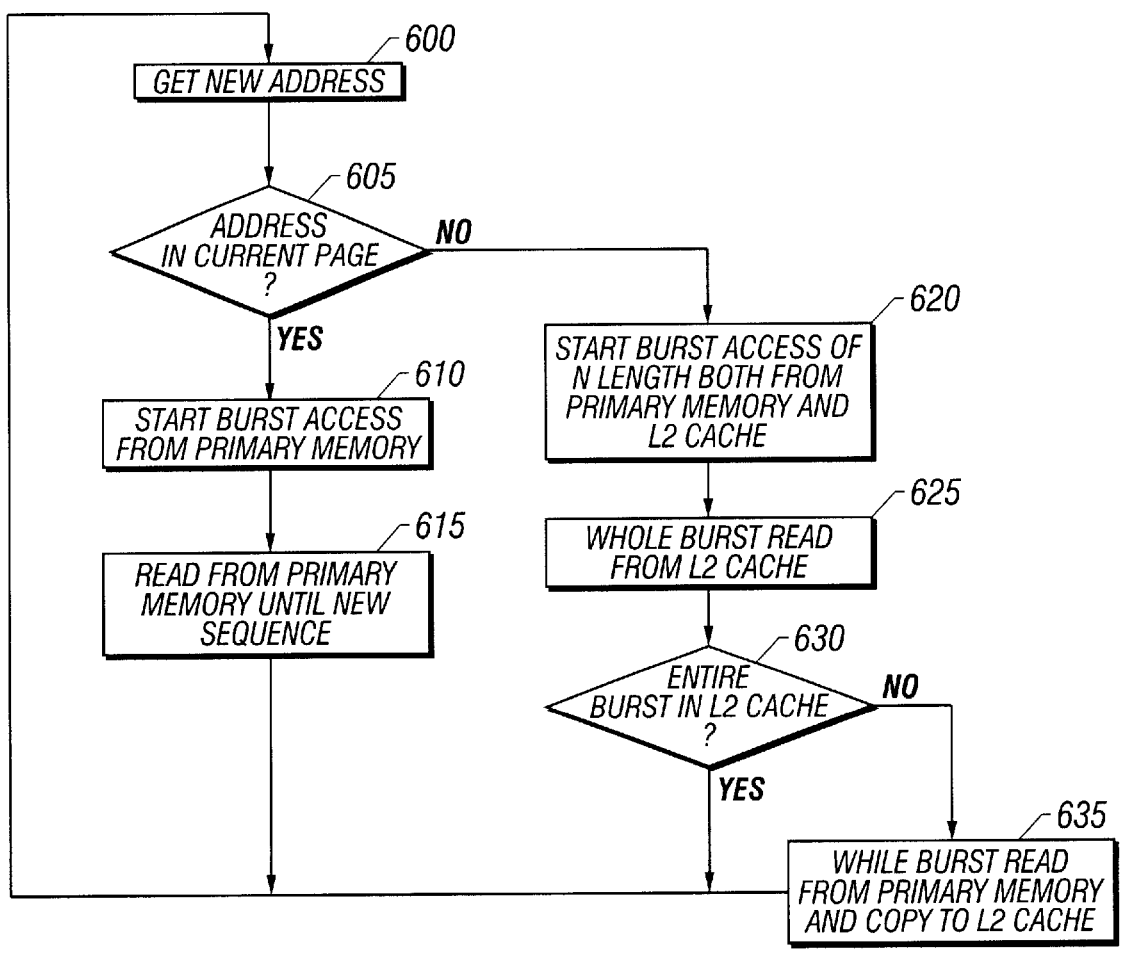
FIG. 6 is a flow diagram of a second embodiment of the present invention.

FIG. 6 shows in a flow chart a second exemplary embodiment of a memory access technique used in the present invention. This embodiment is directed to the use of synchronous memories, with burst capability, as both the primary memory and the L2 cache memory. At step 600 the CPU starts accessing information (e.g. program code or data) from a new address, not found in the internal L1 cache memory, by putting the new address out on the address bus and notifying the MCU of the new address. At step 605 the MCU checks if the address is in the current page of the primary memory, for simplicity the MCU may keep a copy of the last row address provided to the primary memory in an internal register. If, at step 605 the new address is within the current page of the primary memory, the MCU will at step 610 start a burst access, with a length m, of only the primary memory. The burst length m is preferably selected to the average number of consecutive accesses to a page before a new page is accessed. After the burst access is completed at step 615, the next memory address of the next burst sequence is obtained at step 600.

Otherwise, when at step 605 the address was not in the current page of the primary memory, the MCU will at step 620 start a burst access, with a length n, of both the primary memory and L2 cache memory simultaneously. The burst length n is preferably selected so that n accesses from the L2 cache memory will keep the CPU executing without delay while the new page is set up in the primary memory. For a more detailed information on how to select n see description for FIG. 4. At step 625 the MCU reads the whole burst, containing tags and information, from the L2 cache memory. At step 630 the MCU examines the tags to determine if all the information read in the burst is valid, a L2 cache hit, or invalid, a L2 cache miss. If all tags are valid, a L2 cache hit, the next memory address is obtained at step 600.

Otherwise, when at step 630 at least one tag was invalid, a L2 cache miss, the MCU will at step 635 await the new page to be opened in the primary memory and then read the whole burst from the primary memory while also copying the whole burst to the L2 cache memory. Any burst information that has already been read from the L2 cache memory, before the L2 cache miss occurred, is thus also read from the primary memory but only used for the purpose of writing it to the L2 cache memory (the CPU discards this information). The L2 cache memory in this embodiment can, in the event of a L2 cache miss, be updated with the same information that is already in the L2 cache memory. However, because a burst cycle was earlier (step 620) started also from the primary memory, it may be simpler to read the burst again from the start rather than to start a new burst access with a new burst length from the primary memory.

Figure 6A:
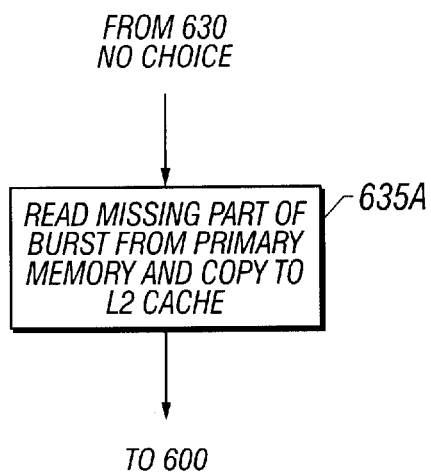
FIG. 6A illustrates an alternative to the embodiment of FIG. 6.

An alternative embodiment awaits opening of the new page in the primary memory at step 635A (see FIG. 6A), and then starts a burst access of the primary memory from the address associated with the L2 cache miss at step 630. The L2 cache memory will with this alternative only be updated with the missing information.

As the MCU is connected to the primary memory and the L2 cache memory with separate address busses, separate control busses and with a shared data bus the L2 cache memory can be updated at the same time as information is delivered from the primary memory. When the whole burst length, n, has been read the next memory address is obtained at step 600.

If the CPU at any point makes a jump in the program code while a burst mode reading is performed it will disregard the information already accessed and start a new burst access by notifying the MCU of the new address. This means that the MCU at any point can be interrupted by the CPU and directed to start a new memory access cycle from step 605.

The memory access described above is directed by a memory controller unit (MCU). As the MCU could be implemented inside the CPU, the above reference to MCU should not be seen as a limitation to the present invention. The method used for accessing primary memory and L2 cache memory can easily be adapted to a different computer architecture.

An important technical advantage of the present invention is the increased efficiency of the higher level cache memory. Another technical advantage of the present invention is the simplified selection of what information to store in the higher level cache memory. Yet another technical advantage of the present invention is the efficient updating of the higher level cache memory. A further technical advantage of the present invention is the reduced execution delay when accessing a new page in primary memory of page type. Yet another technical advantage of the present invention is the improvement in access time for the primary memory after a cache miss.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for accessing memory in a computer containing primary memory of page type and cache memory, comprising the steps of:
   a) comparing an address to access with an open page address in said primary memory;
   b) deciding not to access said cache memory when the step a) comparison indicates that said address to access is within said open sage in said primary memory.

2. The method according to claim 1 further comprising the step of deciding to access said cache memory when said step a) comparison indicates that said address to access is not within said open page in said primary memory.

3. The method according to claim 2 further including the step of accessing both said primary memory and said cache memory if a decision is made to access the cache memory.

4. The method according to claim 3 wherein said access to said primary memory and said cache memory is done simultaneously.

5. The method according to claim 4 wherein said step of accessing both said primary memory and said cache memory includes performing a number of accesses to said cache memory while a new page is being opened in said primary memory.

6. The method according to claim 5 wherein said number is selected so that a processing time of said number of accesses is generally equal to a page opening time in said primary memory.

7. The method according to claim 4 further comprising copying information from said primary memory to said cache memory.

8. The method according to claim 7 wherein said copying of said information is performed when said information is being read from said primary memory.

9. The method according to claim 8 wherein said information is from a selected number of memory addresses first accessed from said open page.

10. The method according to claim 9 wherein said number is selected larger than zero.

11. The method according to claim 9 wherein said number is so selected that a time required to process said information is generally equal to a page setup time in said primary memory.

12. The method according to claim 9 wherein said number is so selected that after said information is accessed a new page access can be expected.

13. The method according to claim 7 wherein said information is from a selected number of memory addresses first accessed from said open page.

14. The method according to claim 13 wherein said number is selected larger than zero.

15. The method according to claim 13 wherein said number is so selected that a time required to process said information is generally equal to a page setup time in said primary memory.

16. The method according to claim 13 wherein said number is so selected that after said information is accessed a new page access can be expected.

17. The method according to claim 3 wherein said step of accessing both said primary memory and said cache memory includes performing a number of accesses to said cache memory while a new page is being opened in said primary memory.

18. The method according to claim 17 wherein said number is selected so that a processing time of said number of accesses is generally equal to a page opening time in said primary memory.

19. The method according to claim 3 further comprising copying information from said primary memory to said cache memory.

20. The method according to claim 19 wherein said copying of said information is performed when said information is being read from said primary memory.

21. The method according to claim 20 wherein said information is from a selected number of memory addresses first accessed from said open page.

22. The method according to claim 21 wherein said number is selected larger than zero.

23. The method according to claim 21 wherein said number is so selected that a time required to process said information is generally equal to a page setup time in said primary memory.

24. The method according to claim 21 wherein said number is so selected that after said information is accessed a new page access can be expected.

25. The method according to claim 19 wherein said information is from a selected number of memory addresses first accessed from said open page.

26. The method according to claim 25 wherein said number is selected larger than zero.

27. The method according to claim 25 wherein said number is so selected that a time required to process said information is generally equal to a page setup time in said primary memory.

28. The method according to claim 25 wherein said number is so selected that after said information is accessed a new page access can be expected.

29. The method according to claim 3 wherein step b) is followed by a continuing access of said cache memory until a cache miss occurs.

30. A data processing system comprising a processor, a primary memory of page type and a cache memory wherein said primary memory and said cache memory are connected to said processor via a common data bus and by respectively separate address busses and separate control busses, the data processing system operating to not access the cache memory if a selected address to access is within an open page in the primary memory, and further operating to access the cache memory if the selected address to access is not within said open page in said primary memory.

31. The system according to claim 30 wherein said cache memory is external to said processor.

32. The system according to claim 31 further comprising means for simultaneously addressing said cache memory and said primary memory independently.

33. The system according to claim 31 further comprising means for reading information from said primary memory during a memory access cycle and copying said information to said cache memory during said memory access cycle.

34. The system according to claim 30 further comprising means for simultaneously addressing said cache memory and said primary memory independently.

35. The system according to claim 30 further comprising means for reading information from said primary memory during a memory access cycle and copying said information to said cache memory during said memory access cycle.

* * * * *

UNITED STATES PATENT AND TRADEMARK OFFICE
CERTIFICATE OF CORRECTION

PATENT NO.     : 6,279,082 B1
DATED          : August 21, 2001
INVENTOR(S)    : Rosendahl et al.

It is certified that error appears in the above-identified patent and that said Letters Patent is hereby corrected as shown below:

<u>Column 9,</u>
Line 25, replace "is within said open sage in said primary memory." with
-- is within said open page in said primary memory. --

Signed and Sealed this

Thirteenth Day of May, 2003

JAMES E. ROGAN
*Director of the United States Patent and Trademark Office*